United States Patent [19]

Nicholson

[11] Patent Number: 4,497,709

[45] Date of Patent: Feb. 5, 1985

[54] TWO PIECE SCREEN FILTER

[75] Inventor: Charles B. Nicholson, Glens Falls, N.Y.

[73] Assignee: Albany International Corp., Menands, N.Y.

[21] Appl. No.: 414,807

[22] Filed: Sep. 3, 1982

[51] Int. Cl.³ .................. B01D 25/08; B01D 25/04
[52] U.S. Cl. .................. 210/489; 210/492; 210/495; 210/499
[58] Field of Search ............. 210/451, 453, 454, 455, 210/471, 483, 488, 489, 492, 495, 499, 237, 238, 314, 335, 339, 474, 477, 486, 413, 465; 150/55

[56] References Cited

U.S. PATENT DOCUMENTS

| | | | |
|---|---|---|---|
| 919,583 | 4/1909 | Houck | 210/476 |
| 2,104,473 | 1/1938 | Watson | 210/486 |
| 2,304,142 | 12/1942 | Bickford | 210/451 |
| 2,308,310 | 1/1943 | Ruemelin | 235/25 |
| 2,532,052 | 11/1950 | Berman | 210/471 |
| 2,551,312 | 5/1951 | Bokich | 210/190 |
| 2,732,092 | 1/1956 | Lawrence | 220/44 |
| 2,853,195 | 10/1958 | Malcolm | 210/471 |
| 2,867,331 | 1/1959 | Bader | 210/471 |
| 2,886,481 | 5/1959 | Swan | 154/116 |
| 2,950,062 | 8/1960 | Aghnides | 210/471 |
| 2,988,168 | 6/1961 | Wittemeier et al. | 183/45 |
| 3,170,875 | 2/1965 | Swett | 210/465 |
| 3,198,334 | 8/1965 | Brucken et al. | 210/489 |
| 3,222,268 | 12/1965 | Clauss | 204/238 |
| 3,303,525 | 2/1967 | Peoples et al. | 210/455 |
| 3,386,580 | 6/1968 | Grabarczyk | 209/237 |
| 3,403,644 | 10/1968 | Heitz | 110/18 |
| 3,557,963 | 1/1971 | Offer | 210/443 |
| 3,836,464 | 10/1974 | Brookins et al. | 210/489 |
| 3,919,089 | 11/1975 | Gonzalez | 210/451 |
| 3,954,621 | 5/1976 | Etani et al. | 210/314 |
| 4,028,248 | 6/1977 | Murauskas | 210/232 |
| 4,064,571 | 12/1977 | Phipps | 4/506 |
| 4,132,649 | 1/1979 | Croopnick | 210/347 |
| 4,145,196 | 3/1979 | Alskog | 210/315 |
| 4,199,456 | 4/1980 | Cheesman | 210/232 |
| 4,225,440 | 9/1980 | Pitesky | 210/346 |

Primary Examiner—Richard V. Fisher
Assistant Examiner—Wanda L. Millard
Attorney, Agent, or Firm—Kane, Dalsimer, Kane, Sullivan & Kurucz

[57] ABSTRACT

A double filter for detachably coupling a first filter and a second filter together in a layer like fashion wherein the first filter includes a first filter media with a rigid member about its perimeter and the second filter includes a resilient sleeve about the perimeter of a second filter media whereby the sleeve and accordingly the second filter is capable of being stretched over the rigid member so as to detachably couple the second filter to the first.

16 Claims, 3 Drawing Figures

TWO PIECE SCREEN FILTER

FIELD OF THE INVENTION

The present invention is directed towards a filter screen, particularly one involving two piece separate filter medias.

BACKGROUND OF THE INVENTION

There presently exists a wide variety of filter screens and mounting therefore. Some are single screens made of a single type media however others provide a double filter unit. In such double screen units there is usually involved a fine screen media with a backup or coarse media spaced therefrom in tandem. Both filters are usually fixedly attached to a support means, such as a metal hoop or frame during assembly. This prefabrication is therefor required prior to shipping to the consumer. The filter unit is then usually placed into a support provided in a filter tank.

It has been found that while such an arrangement may be satisfactory in certain circumstances, it suffers certain disadvantages. Firstly, transportation of such filter units for replacement or repair, etc., is bulky and expensive. Also, should a different type fine or coarse filter in the combination be desirable replacement of the entire filter unit is required rather than a mere substitution. This applies equally to the repair or replacement of a damaged filter which would require a return of the entire unit for working, or its entire replacement. Accordingly, with prior filter units, the user of such filters had limited flexibility regarding filter selection and replacement of individual filter screens.

SUMMARY OF THE INVENTION

It is therefore a principal object of the invention to provide for a two screen unit which does not require its fabrication as a permanent single unit so that the filter screens can be selectively repaired, substituted or replaced without excessive cost.

It is another object to provide for a two filter screen unit which does not require preassembly prior to shipping allowing for portions thereof to be shipped individually and relatively inexpensively.

The present invention provides for a two screen filter having a relatively rigid outer support or ring in which a first filter media (coarse) is fixedly attached about its perimeter. A second filter media (fine) is provided and fixedly attached about its perimeter to a sleeve made of a resilient material which is formed so as to be stretched into a bearing coupling with the ring, securing the second filter with respect to the first filter. This allows for selectivity and replacement of the second filter with respect to the first in both the initial purchase of the fitter and its subsequent use and when necessary replacement. The stocking of extra or different type second filters by the user allows for ready replacement or substitution thereof should this become necessary, adding to the flexibility of operation of the user.

Also, the need to preassemble the filter prior to shipping is not required as was herebefore required, advantageously allowing for separate shipment of the filter screens purchase with on-site assembly readily accomplished, thus reducing transportation costs. Note that due to the resilient sleeve of the second filter, it allows for a folding of this filter screen prior to shipping, which is an additional cost saver. This of course is subject to the foldability of the filter media.

BRIEF DESCRIPTION OF THE DRAWINGS

Thus by the present invention its objects, advantages and others will be realized, the description of which should be taken in conjunction with the drawings wherein.

DETAILED DESCRIPTION OF THE PREFERRED EMBODIMENT

Figure 1:
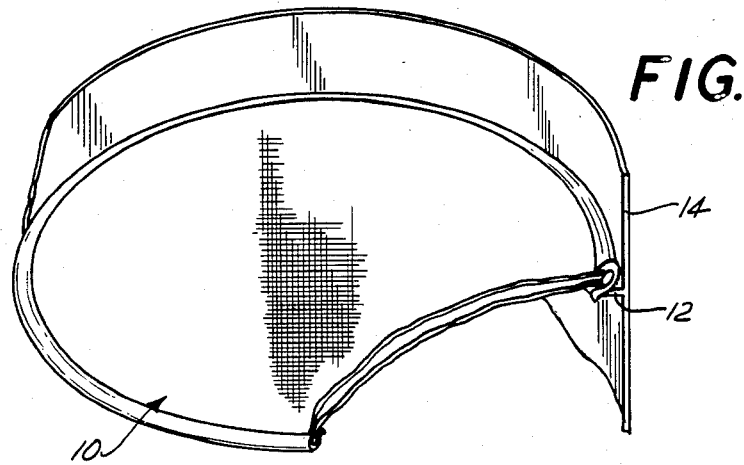
FIG. 1 is a partially sectional view of the double filter screen supported by a filter tank wall, incorporating the teachings of the present invention.
Figure 2:
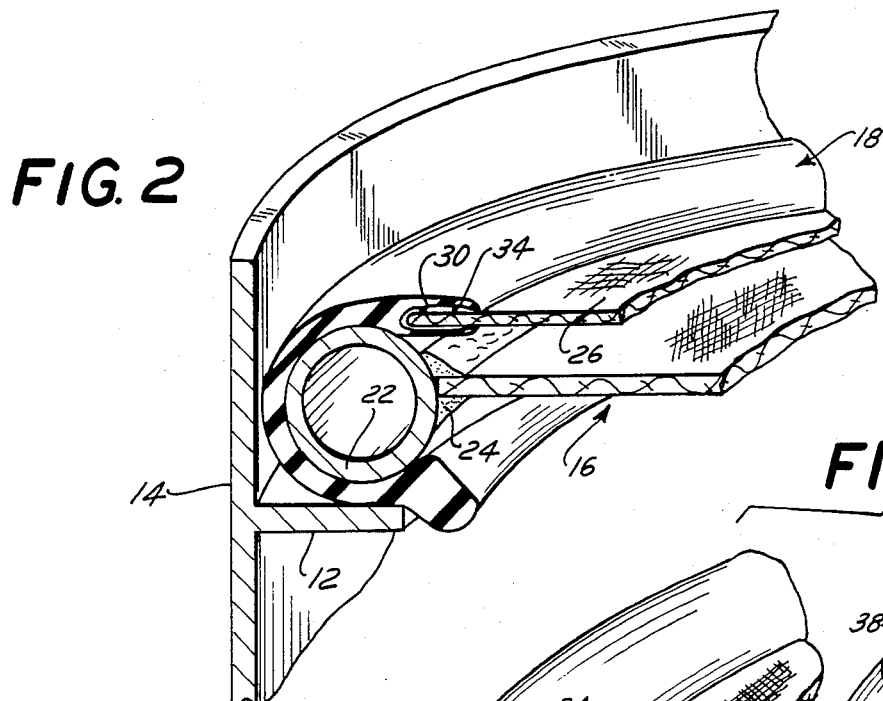
FIG. 2 is a sectional view of the double filter arrangement and support, incorporating the teachings of the present invention.
Figure 3:
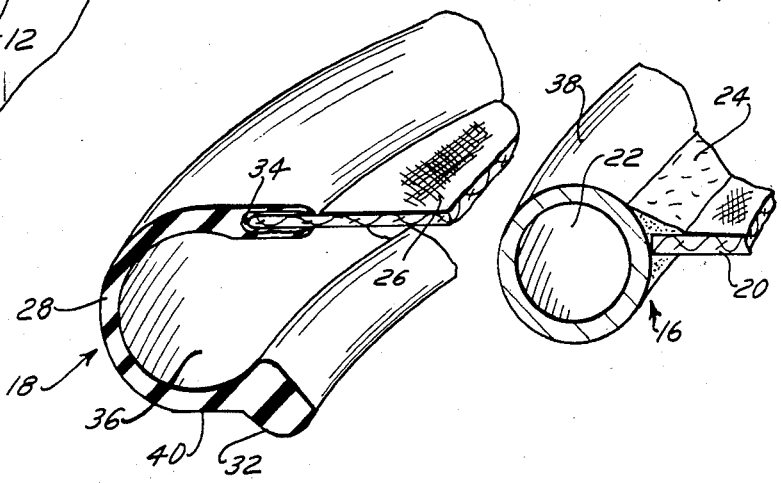
FIG. 3 is a partially exploded partially sectional view of the double filter, incorporating the teachings of the present invention.

Turning now more particularly to the drawings, there is shown a double or two piece filter unit 10 supported at its perimeter by a flange 12 maintained on the interior wall 14 of a circular filter tank wall. Note that in typical applications utilizing these double filters, i.e., in paper making etc., the diameter of the filters vary with purpose (i.e., typically 4'-12'). Accordingly, a filter tank should have an internal diameter slightly larger than the outer diameter of the filter to allow for its ready placement in the type of tank shown.

The double filter unit 10 comprises a first or back up filter 16 and a second filter 18 detachably coupled together. Note that the terms first and second are used merely to distinguish the filters within this discussion and do not necessarily serve to characterize the filters operation in any other respect.

Returning now to the first filter 16, this is made up of a circular filter media 20 which is preferably coarse in nature such as for example No. 10 wire mesh. Coarse media is preferred for this filter since selectivity, upon repair or replacement of a double filter as depicted, usually involves the finer filter, with the coarse one less likely to be involved in this regard. As such, filter 20 is fixedly attached to an outer ring 22 formed from a rolled pipe or tubing which is made of a relatively rigid material, i.e., stainless steel and rolled into a flat hoop or circle and butt welded end to end. Of course, this outer ring may be made of any other material suitable for purpose such as plastic resins, fiber glass etc.

The filter media 20 may be attached about its circumference to the outer ring's 22 inner diameter in any manner which is effective in securing it thereto, however an epoxy adhesive 24 therebetween has been found desirable and effective.

The first filter 16 is adapted to be releasably coupled to the second filter 18. In this regard, the second filter 18 comprises a circular filter media 26, preferably of a fine nature for the reasons aforenoted, which is fixedly coupled about its circumference to a resilient sleeve 28 made of rubber etc., or any other material suitable for purpose. In this regard, the sleeve 28 is of a generally U-shaped configuration having a slot 30 at one end and a thickened flange portion 32 at its other end. Slot 30 serves as a receptacle for the perimeter of the filter media 26 which may similarly be fixed thereon by an epoxy adhesive 34 or again any other means suitable for purpose.

Note that the internal circular surface 36 of the sleeve 28 is intended to embrace resiliently the outer surface 38 of ring 22 in a friction relationship due to the resiliency of sleeve 28, and should be dimensioned accordingly. In this regard, coupling the two filters together involves stretching the sleeve 28 to a slightly greater diameter than the outside diameter of ring 22 and sliding it thereover. Removal would be performed in just the opposite way.

Note that to facilitate this stretching, the flange 32 may be grasped in this regard to provide leveraging as a section by section of the sleeve 28 as stretched about the ring 22. In addition, the flange 32 tends to slant downward, at an angle from a flat surface 40 which rests on shelf 12. This arrangement serves to prevent the lateral shifting of the filter 10 on the shelf by the engagement of shelf 12 and flange 32, should the distance between the filter unit 10 and the wall 14 be excessive.

Thus by the present invention its objects and advantages are readily realized and although a preferred embodiment has been disclosed and described in detail herein, its scope should not be limited thereby rather its scope should be determined by that of the appended claims.

What is claimed is:

1. A filter unit for filtering a substance by having the substance pass through successive filter media positioned in a layered like fashion, said unit comprising:
   a first filter including first filter media supported by a substantially rigid member about said filter's perimeter;
   a second filter including second filter media and sleeve means detachably coupled to said rigid member;
   said sleeve means being of a resilient material; and
   wherein said sleeve means is capable of being stretched into a bearing coupling about a portion of said rigid member so as to detachably maintain said second filter adjacent said first filter in a layered relationship so as to allow successive filtering by the first and second filter media.

2. The filter unit in accordance with claim 1 wherein said first and second filters are generally flat; and said rigid member being a hoop about the first filter media's perimeter which is fixedly attached thereto.

3. The filter unit in accordance with claims 1 or 2 which includes bonding means about the first and second filter media bonding them respectfully to the rigid member and sleeve means.

4. The filter unit in accordance with claim 3 wherein said first filter media is a coarser filter quality than the second filter media.

5. A filter unit comprising:
   a first generally flat filter including first filter media supported by a substantially rigid member in the form of a hoop having a substantially circular cross section and positioned about said filter media perimeter fixedly coupled thereto;
   a second generally flat filter including second filter media and sleeve means detachably coupled to said rigid member;
   said sleeve means being of a resilient material and having a somewhat U-shaped cross section having a first arm coupled to said second filter media with the arch of the U engagable with a portion of said hoop; and
   wherein said sleeve means is capable of being stretched into a bearing coupling about a portion of said rigid member so as to detachably maintain said second filter adjacent said first filter in a layered relationship.

6. The filter unit in accordance with claim 5 wherein said sleeve means terminates at a second arm of the U; and said first and second arms being substantially parallel when said sleeve means is disposed about said hoop.

7. The filter unit in accordance with claim 6 wherein said second arm terminates in a flange portion capable of facilitating the stretching of the sleeve means over the hoop, by the grasping of said flange and applying pressure to extend the second arm beyond the hoops outer diameter for purposes of stretching the sleeve means thereover.

8. The filter unit in accordance with claim 7 wherein said second arm includes a flat portion adapted to rest on a shelf support of a filter tank.

9. The filter unit in accordance with any one of claims 5–8 which includes bonding means about the circumference of the first and second filter media bonding them respectively to the rigid member and sleeve means.

10. The filter unit in accordance with claim 9 wherein said first filter media is of a coarser filter quality than the second filter media.

11. The filter unit in accordance with any one of claims 5–8 wherein said first filter media is of a coarser filter quality than the second filter media.

12. A detachable first filter for detachably coupling in a layer like fashion to a second filter having a substantially rigid member about its perimeter for providing successive filters for filtering, said detachable first filter comprising:
   a filter media having a sleeve means about its perimeter;
   said sleeve means being resilient having a somewhat U-shaped cross section with a first arm of the U coupled to the filter media with the arch of the U adapted to engage a portion of the rigid member; and
   wherein said sleeve is capable of being stretch fitted over a portion of the rigid member so as to be detachably maintained adjacent said second filter in a layered relationship so as to allow successive filtering by said detachable first filter and second filter.

13. The detachable first filter in accordance with claim 2 wherein said sleeve means is resilient and terminates at a second arm of the U, said first and second arms are adapted to be parallel when said sleeve means is disposed about said rigid member.

14. The detachable first filter in accordance with claim 13 wherein said second arm terminates in a flange portion capable of facilitating the stretching of the sleeve means over the rigid member by the grasping of said flange and applying pressure to extend the second arm beyond said rigid members outer diameter for purposes of stretching the sleeve means thereover.

15. The detachable first filter in accordance with claim 14 wherein said second arm includes a flat portion adapted to rest on a shelf support of a filter tank.

16. The detachable first filter in accordance with any one of claims 12–15 which includes bonding means about the circumference of the detachable first filter bonding it to the sleeve means.

* * * * *